(No Model.)

T. E. MACY.
CHURN.

No. 338,280. Patented Mar. 23, 1886.

WITNESSES:
Robert Kirk
C. H. Jones

INVENTOR:
T. E. Macy
By ____
Attorney.

UNITED STATES PATENT OFFICE.

THOMAS E. MACY, OF BERNE, INDIANA.

CHURN.

SPECIFICATION forming part of Letters Patent No. 338,280, dated March 23, 1886.

Application filed February 13, 1885. Serial No. 155,797. (No model.)

*To all whom it may concern:*

Be it known that I, THOMAS E. MACY, of Berne, in the county of Adams and State of Indiana, have invented a new and useful Improvement in Churns, which improvement is fully set forth in the following specification and accompanying drawings, in which—

Figure 1:
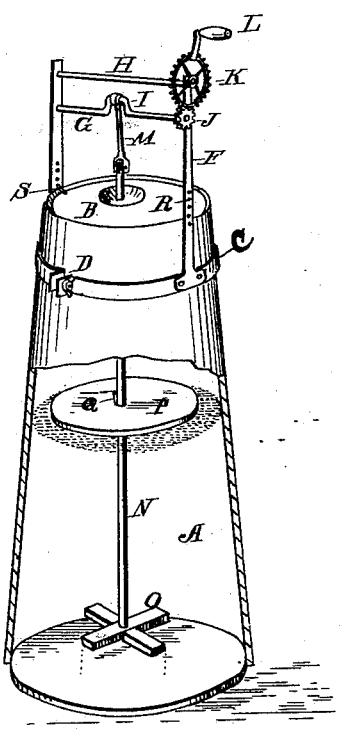
Figure 2:
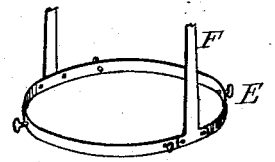

Figure 1 is a perspective view, partly in section, of my improved churn; and Fig. 2 is a view of a modified form of the band which encircles the churn-body.

The object of the present invention is to provide the ordinary upright churn-body with a stand or frame, upon which is mounted a set of pinions, crank, and connecting-rod, which latter is connected with the dash, as will be hereinafter set forth; and it consists in the construction and combination of parts, which will be hereinafter fully explained, and particularly pointed out in the claim at the end of the specification.

In the accompanying drawings, A represents the churn-body, of ordinary construction, and B the top or lid.

C is a band or hoop, which may be open at one side, as shown at D, and provided with a bolt or thumb-screw, so as to tighten the same around the churn; or the band may be made continuous, and merely depend upon friction for tightening the same; or it may be made, as shown in Fig. 2, with one or more thumb-screws, E, so as to hold it firmly to the churn-body. This band is provided on opposite sides with standards F, having at the upper end two cross-shafts, G H, the lower cross-shaft having centrally a crank, I, and at the end a small pinion, J. The upper shaft, H, is also provided at one end with a large pinion, K, which meshes with the small pinion J, and the crank L is attached to the large pinion K. M is the connecting-rod, which connects the crank with the dash-rod N. On the lower end of the dash-rod is placed a cross-head, O, of any suitable conformation or size, and sliding upon this dash-rod is a disk, P.

Q represents a key by the side of the dash-rod, passing through the disk, so that the said disk can be adjusted upon the dash-rod at any point.

It is evident that there is nothing new in the construction of a dash with the cross-head O, as shown; but it is in the adjustable character of the disk P and its functions in connection with the adjustable band C, the perforated upright standards, and the agitator-head O that my invention lies.

The crank I is made preferably small, so that the reciprocation of the dash-rod will be much less than the reciprocation usually employed in the dash-churns.

In operation the disk P is adjusted upon the dash-rod so that when the crank causes it to reciprocate, the disk instead of being buried at each motion in the cream will merely beat the surface, and as the cross-head O is attached to the same stem or rod and subject to the same motion, the cream will be continuously agitated and placed in direct contact with the disk P.

By means of the key Q the disk can be adjusted so as to provide for any quantity of cream within the churn.

It is obvious that the frame heretofore referred to can be readily attached to the churn or removed therefrom, and for the purpose of making the lid permanently immovable during the operation of churning I have the standards F provided with a series of perforations, R, so as to receive pins S, which rest upon the upper surface of the lid, thus causing the lid to act as a guide for the upper end of the dash-rod N.

I am aware that it is old to secure dash-operating devices to churn-bodies by means of a band similar to that used by me and a tightening-screw engaging the ends of the same; and I am also aware that it is common to provide dash-rods with adjustable surface-beaters, and I lay no claim, broadly, to either of such constructions.

Having described my invention, what I claim is—

The combination, with the churn-body, a dash-rod provided with a dasher and an adjustable surface-beater, and mechanism for operating said dash-rod, of the band C, provided with clamp-screws, the perforated standards secured to said band and supporting the driving devices, and the pins S, resting upon the upper side of the lid B, substantially as described.

In testimony that I claim the foregoing I have hereunto set my hand this 16th day of January, 1885, in the presence of witnesses.

THOMAS E. MACY.

Witnesses:
O. J. BAILEY,
WM. B. JONES.